United States Patent
Lei et al.

(10) Patent No.: US 11,395,107 B1
(45) Date of Patent: Jul. 19, 2022

(54) MULTICAST ASSISTED PARKING LOT MANAGEMENT

(71) Applicant: FORD GLOBAL TECHNOLOGIES, LLC, Dearborn, MI (US)

(72) Inventors: Oliver Lei, Windsor (CA); Vladyslav Slyusar, Northville, MI (US); Somak Datta Gupta, Novi, MI (US); Jayanthi Rao, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/181,558

(22) Filed: Feb. 22, 2021

(51) Int. Cl.
*H04W 4/06* (2009.01)
*G08G 1/14* (2006.01)
*H04W 4/12* (2009.01)
*H04W 4/44* (2018.01)

(52) U.S. Cl.
CPC .............. *H04W 4/06* (2013.01); *G08G 1/141* (2013.01); *G08G 1/146* (2013.01); *H04W 4/12* (2013.01); *H04W 4/44* (2018.02)

(58) Field of Classification Search
CPC .......... G08G 1/14; G08G 1/141; G08G 1/144; G08G 1/146; G08G 1/148; B60W 30/06
See application file for complete search history.

(56) References Cited

U.S. PATENT DOCUMENTS

| | | | | |
|---|---|---|---|---|
| 10,545,510 | B2 * | 1/2020 | Colijn | G06Q 10/04 |
| 2006/0267799 | A1 * | 11/2006 | Mendelson | G08G 1/14 |
| | | | | 340/932.2 |
| 2012/0130872 | A1 * | 5/2012 | Baughman | G08G 1/146 |
| | | | | 705/32 |
| 2012/0130891 | A1 * | 5/2012 | Bogaard | G07B 15/02 |
| | | | | 705/40 |
| 2013/0231128 | A1 | 9/2013 | Terzidis | |
| 2015/0130641 | A1 * | 5/2015 | Rahman | G08G 1/144 |
| | | | | 340/932.2 |
| 2018/0122152 | A1 | 5/2018 | Shin | |
| 2020/0086853 | A1 * | 3/2020 | Kumar | G05D 1/0088 |
| 2020/0143140 | A1 * | 5/2020 | Sakanashi | G08G 1/143 |

FOREIGN PATENT DOCUMENTS

| | | |
|---|---|---|
| CN | 108648503 A | 10/2018 |
| KR | 20120111362 A | 10/2012 |
| WO | 2016163817 A1 | 10/2016 |
| WO | 2019221612 A1 | 11/2019 |

OTHER PUBLICATIONS

NPL_search (Oct. 19, 2021).*

* cited by examiner

*Primary Examiner* — Van T Trieu
(74) *Attorney, Agent, or Firm* — Michael J. Spenner; Brooks Kushman P.C.

(57) ABSTRACT

A point-to-multipoint retransmit of the parking availability data is performed with a predefined update period. A quantity of unicast requests for parking availability is received via one or more cellular towers. If the quantity of unicast requests received within the predefined update period exceeds a ratio of point-to-multipoint bandwidth to unicast messaging bandwidth of the one or more cellular towers, a transition is made to use of the point-to-multipoint messaging for sending the parking availability data via the one or more cellular towers; and otherwise, a transition is made to use of the unicast messaging for sending the parking availability data via the one or more cellular towers.

23 Claims, 4 Drawing Sheets

MULTICAST ASSISTED PARKING LOT MANAGEMENT

TECHNICAL FIELD

Aspects of the disclosure relate to the selective use of point-to-multipoint (P2M) technology vs. unicast messaging for parking spot acquisition.

BACKGROUND

A parking lot is an area designated for the parking of vehicles. Many parking lots are divided into spaces. These spaces may be painted or otherwise drawn on the parking lot. In some instances, a gate or other control may be used to limit access to the parking lot. Some parking lots also require payment to park.

SUMMARY

In a first illustrative embodiment, a system for selective use of point-to-multipoint messaging and unicast messaging for parking spot acquisition is provided. The system includes one or more cellular towers configured to provide wireless services to a parking location over the point-to-multipoint messaging and the unicast messaging. The system further includes a server, in communication with the one or more cellular towers, programmed to identify a quantity of vehicles present in the parking location, and utilize either the point-to-multipoint messaging or the unicast messaging based on the quantity of vehicles.

In a second illustrative embodiment, a method for selective use of point-to-multipoint messaging and unicast messaging for parking spot acquisition is provided. A point-to-multipoint retransmit of the parking availability data is performed with a predefined update period. A quantity of unicast requests for parking availability is received via one or more cellular towers. If the quantity of unicast requests received within the predefined update period exceeds a ratio of point-to-multipoint bandwidth to unicast messaging bandwidth of the one or more cellular towers, a transition is made to use of the point-to-multipoint messaging for sending the parking availability data via the one or more cellular towers; and otherwise, a transition is made to use of the unicast messaging for sending the parking availability data via the one or more cellular towers.

In a third illustrative embodiment, a non-transitory computer-readable medium includes instructions for selective use of point-to-multipoint messaging and unicast messaging for parking spot acquisition that, when executed by a processor of a server in communication with one or more cellular towers, cause the server to perform operations including to perform a point-to-multipoint retransmit of parking availability data with a predefined update period; receive, via the one or more cellular towers, a quantity of unicast requests for parking availability; if the quantity of unicast requests received within the predefined update period exceeds a ratio of point-to-multipoint bandwidth to unicast messaging bandwidth of the one or more cellular towers, transition to use of the point-to-multipoint messaging to send the parking availability data via the one or more cellular towers; and otherwise, transition to use of the unicast messaging to send the parking availability data via the one or more cellular towers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Aspects of the disclosure relate to the selective use of point-to-multipoint communication technology, in combination with unicast messaging for parking spot acquisition. An example of point-to-multipoint communication technology may be the use of Evolved Multimedia Broadcast Multicast Services (eMBMS).

A parking server broadcasts parking lot availability to all vehicles in an area. A vehicle enters the coverage area and receives availability information from the parking server. The vehicle may display available parking spots in the vehicle HMI. A user of the HMI may lock an available parking spot before reaching it. Responsive to parking, the vehicle may send a confirmation that the vehicle has taken the spot. The vehicle may also be configured to receive selection from the HMI to release the spot when leaving.

While point-to-multipoint communication technology (such as eMBMS) may be efficient for small quantities of vehicles, a broadcast system may become overloaded if the parked cars exceed a threshold amount. If the quantity of parked vehicles exceeds the threshold amount (in an example, 70% occupancy), the server may trigger a stop of the multipoint broadcasting service. The threshold amount may additionally or alternately depend on real-time multicast subscribers independent of parking availability. For instance, the parking lot may be empty, but without many users looking for a spot, unicast may be more efficient use of bandwidth. Such a threshold could be, for example, greater than ten unicast requests each minute before switching to multipoint.

Figure 1:
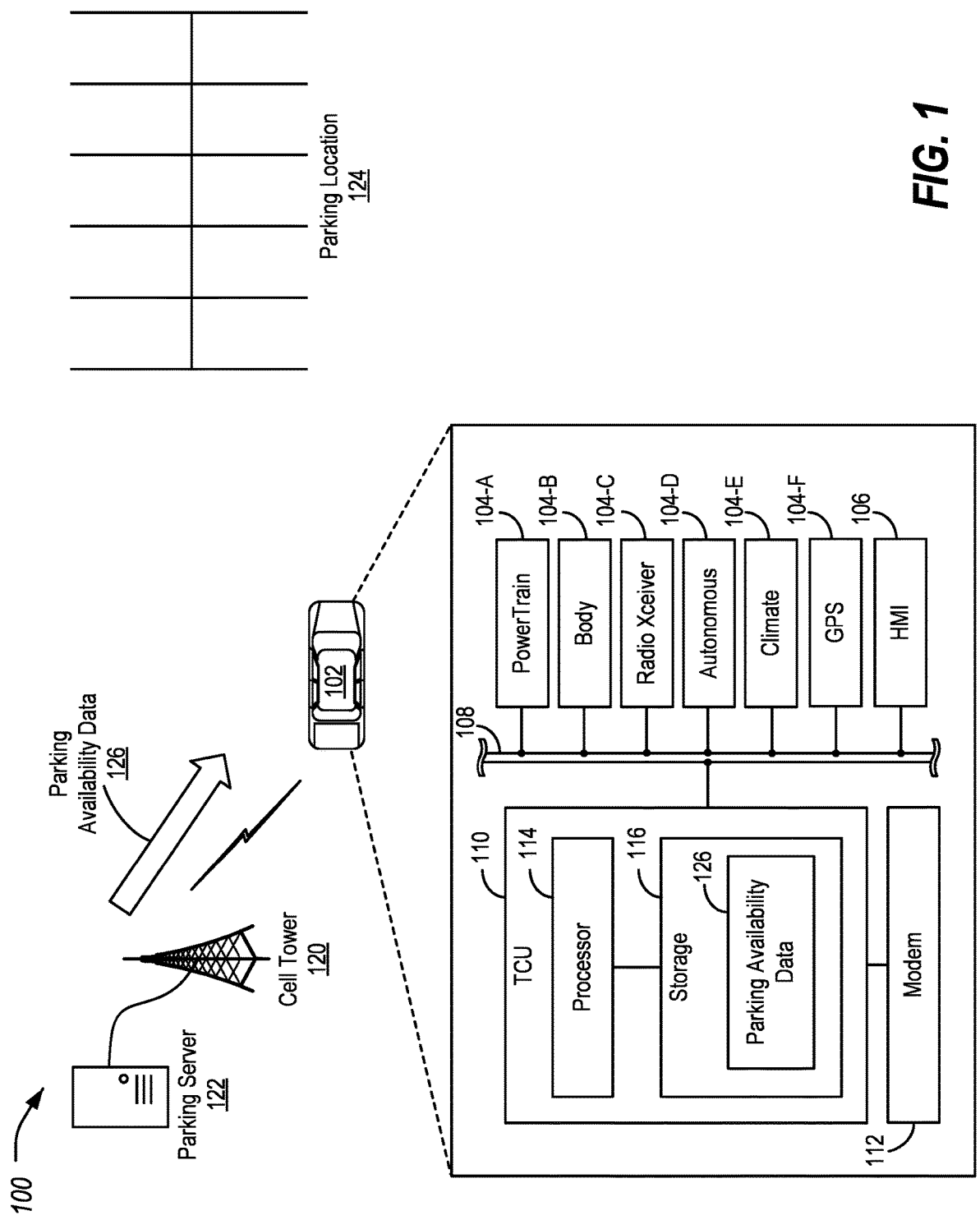
FIG. 1 illustrates an example system for the selective use of multipoint broadcast technology and unicast messaging for parking spot availability.

FIG. 1 illustrates an example system 100 for the selective use of multipoint broadcast technology and unicast messaging for parking spot availability. The vehicle 102 may include various types of automobile, crossover utility vehicle (CUV), sport utility vehicle (SUV), truck, recreational vehicle (RV), boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle, a parallel hybrid electrical vehicle, or a parallel/series hybrid electric vehicle.

The vehicle 102 may be human driven or an autonomous vehicle (AV). The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs). It should be noted that while automotive vehicles 102 are being used as examples of traffic participants, other types of traffic participants may additionally or alternately be used, such as bicycles, scooters, and motorcycles, which may desire parking and be equipped with wireless communications technology.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., 104-A through 104-G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an autonomous controller 104-D may be configured to provide commands to control the powertrain, steering, or other aspects of the vehicle 102; a climate control management controller 104-E may be configured to provide control of heating and cooling system components (e.g., compressor clutch, blower fan, temperature sensors, etc.); a global positioning system (GPS) controller 104-F may be configured to provide vehicle location information.

A human-machine interface (HMI) controller 106 may also be configured to receive user input via various buttons or other controls, as well as provide vehicle status information to a driver via one or more display screen, touchscreens, speakers, etc. This status information may include, as some non-limiting examples, fuel level information, engine operating temperature information, and current location of the vehicle 102.

The vehicle bus 108 may include various methods of communication available between the vehicle controllers 104 and the HMI 106, as well as between the telematics control unit (TCU) 110 and the vehicle controllers 104. As some non-limiting examples, the vehicle bus 108 may include one or more of a vehicle controller area network (CAN), an Ethernet network, and a media-oriented system transfer (MOST) network. Further aspects of the layout and number of vehicle buses 108 are discussed in further detail below.

The TCU 110 may include network hardware configured to facilitate communication between the vehicle controllers 104 and with other devices of the system 100. For example, the TCU 110 may include or otherwise access a cellular modem 112 configured to facilitate communication with other vehicles 102 or with infrastructure. This infrastructure may include various cellular towers 120 of a cellular network, in an example. A wireless carrier may maintain a plurality of cell towers 120, one or more mobile switching centers (MSCs), as well as any other networking components required to connect the wireless system with other communications networks. The cell towers 120 may include sending and receiving antennas and a base station, with the base stations from different cell towers 120 being connected to the MSC.

The TCU 110 may be configured to communicate with the cell towers 120 over various protocols, such as point-to-point communications over a communication network over a network protocol (such as Uu). The TCU 110 may, additionally or alternately, be configured to communicate over a broadcast protocol (such as PC5), to facilitate C-V2X communications with devices such as other vehicles 102. The TCU 110 may also be configured to communicate over P2M, such as via evolved multimedia broadcast multicast services (eMBMS). It should be noted that these protocols are merely examples, and different peer-to-peer, P2M, and/or unicast cellular technologies may be used.

The cellular towers 120 may be configured to support the connections of the TCU 110 to the network. For instance, when a vehicle 102 enters an area, the TCU 110 may attempt to attach to the cell tower 120 and establish cellular service. When the vehicle 102 leaves the area, the TCU 110 may be handed off to another cell tower 120 in another area to allow the TCU 110 to continue to be connected to the network.

The TCU 110 may include various types of computing apparatus in support of performance of the functions of the TCU 110 described herein. In an example, the TCU 110 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The TCU 110 may be configured to include one or more interfaces from which vehicle information may be sent and received to a parking server 122. In an example, the parking server 122 may also include one or more processors (not shown) configured to execute computer instructions, and a storage medium (not shown) on which the computer-executable instructions and/or data may be maintained.

In many cases, it may be desirable to park the vehicle at a destination between uses. In an example, the parking may be performed at a parking location 124. The parking location 124 may have a predefined set of spots for vehicles 102 to park. As some examples, the parking location 124 may be a parking garage, a surface parking lot, and/or street parking.

The parking server 122 may be configured to send parking availability data 126 to vehicles 102. The parking availability data 126 may include information indicative of which spots in the parking location 124 are available or unavailable for parking. The parking availability data 126 may further include other information, such as the cost to park, hours of operation, etc.

Figure 2:
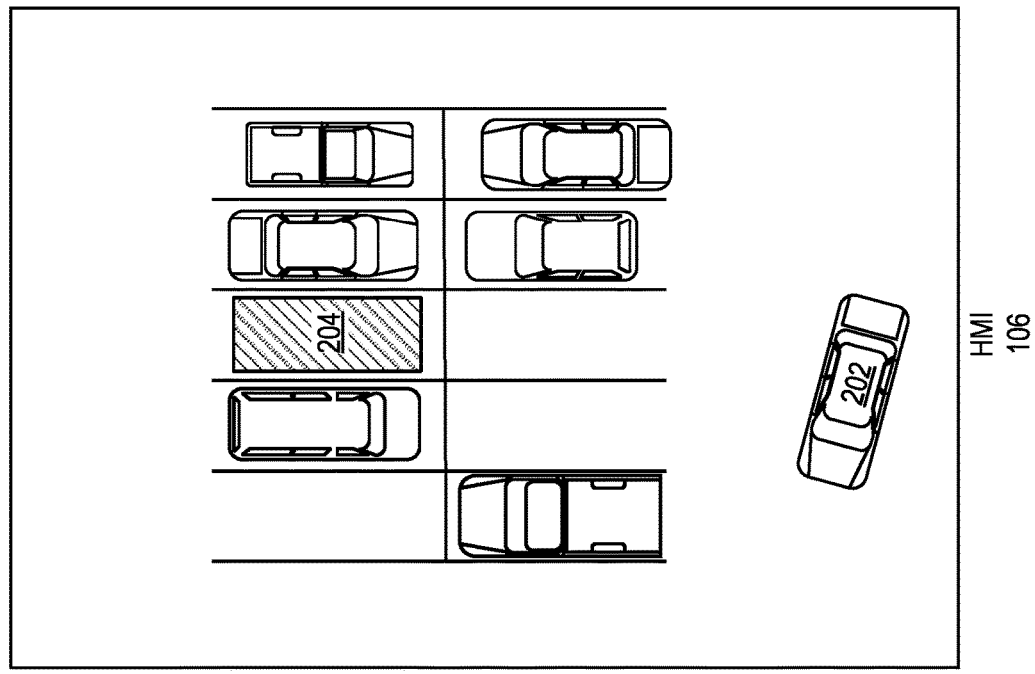
FIG. 2 illustrates an example of interaction of vehicles with the parking server.
Figure 2:
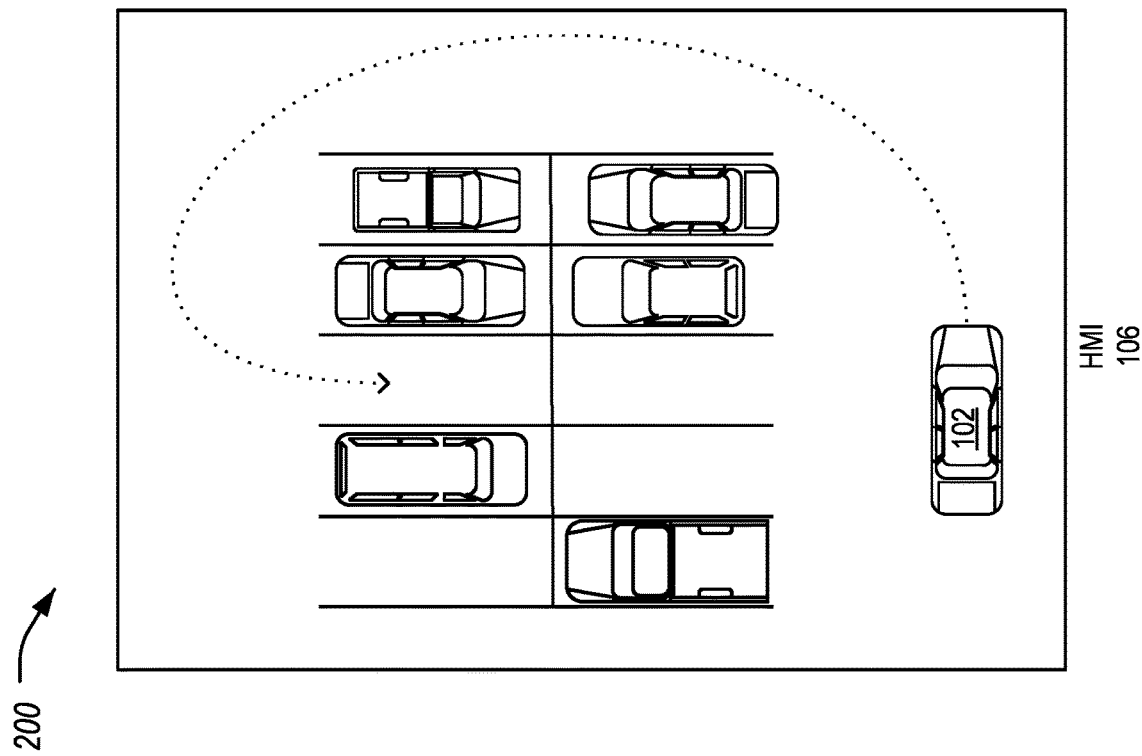

FIG. 2 illustrates an example 200 of interaction of vehicles 102 with the parking server 122. For example, the parking server 122 may broadcast the parking availability data 126, which may indicate geofenced parking location 124 availability to vehicles 102 in proximity to the parking location 124. The parking location 124 may involve one or more lots, such as on a campus. Vehicles 102 coming to the campus may receive the parking lot availability as broadcast by the server 122. This broadcast may be done, for instance, by a network operator using an eMBMS service, and may involve one or more than one cell towers 120 to cover the campus. For instance, the eMBMS service may broadcast parking lot availability to all vehicles 102 on campus, all day or only during a predefined period such as morning rush hour (e.g., 7:00 am-9:00 am).

A vehicle 102 may enter the campus coverage area and may receive the availability information from the server 122 for display on the HMI 106. A vehicle 102 outside of the campus coverage area is intended not to receive this information. Nevertheless, if it occurs that a vehicles 102 inside the broadcast coverage, but outside a geofenced area indicated in the broadcast receives the information, that vehicle 102 may filter out the parking lot availability data, as such parking is not relevant to the location of the vehicle 102.

Responsive to the vehicle 102 receiving parking availability data 126 and being within the geofence, the vehicle 102 may display information indicative of the parking availability data 126 on the HMI 106. (Shown on the left in FIG. 2) This information may include, in an example, a 2D graphical representation of the parking location 124, with occupied and unoccupied parking spots indicated. The available spots may be selectable via the HMI 106.

In one example, the HMI 106 may include a touch screen, and the user may select a parking spot by pressing on the available spot on the touch screen. In response to the selection of the parking spot, the vehicle 102 uses the TCU 110 to send an indication of the spot to the parking server 122. In an example, the TCU 110 may send the lock request to the server 122 as a unicast channel upload. Responsive to receipt of the message, the server 122 may lock the spot as unavailable to other vehicles 102 and inform the other vehicles 102 of the change in status. The spot status may accordingly be shown by indication 204 in the HMI 106 of the other vehicles 202 as locked. (Shown on the right in the FIG. 2)

The server 122 may then update the parking spot to be in the locked state and may re-broadcast that update to any listening vehicles 202. As shown in the HMI 106 of the listening vehicle 202, the spot that the vehicle 102 is intended to use is shown in a locked state at indication 204. If two or more vehicles 102 attempt to lock the same spot, the server 122 may confirm the first response with a locked confirmation, and may respond to the second with a locked by another notification, so that the second vehicle 102 may be informed to select a different spot. This may help reduce double-lock issue between vehicles 102, as the server 122 may function as a single control point. As the server 122 is the gatekeeper, double-lock issues by multiple vehicles 102 may be prevented.

Responsive to the vehicle 102 receiving the spot confirmation, the HMI 106 may provide an option to release the spot. This may be chosen, for instance, if the vehicle 102 or vehicle 102 occupant elects not to park in the spot.

The server 122 may further prevent a vehicle 102 outside of the coverage area to attempt to lock a spot. This may be done by confirming the origin location of a message sent by the vehicle 102, and/or based on information indicative of the vehicle 102 location provided by the vehicle 102 in the message.

In another example, instead of user selection, the server 122 may perform an auto assignment function to allow the server 122 to assign the parking spot instead. An occupant of the vehicle 102 may select the auto assign function from the HMI 106. Or, the server 122 may do so automatically based on predefined settings. Regardless of the trigger, the server 122 may choose the spot, update the parking spot to be in the locked state, and may re-broadcast that update to the vehicle 102 as well as to any other listening vehicles 202.

The parking spot choice by the server 122 may be performed based on personalized parking lot preferences for the vehicle 102 (or vehicle user). These personalized parking lot preferences may include preferences relating to one or more of level, side/middle, near elevator, compact/truck lot, EV lot, etc., or first available. Thus, the server 122 may be configured to automatically assign a spot based on the preference settings.

In some instances, there may be preferred spots that incur a fee or an additional fee beyond a standard spot. This information may be included in the broadcast, and the vehicle 102 may indicate which of the spots are preferred spots in the HMI 106.

The vehicle 102 may navigate to (or be autonomously navigated to) the spot and park. Responsive to marking, the TCU 110 may send a parked confirmation message to the server 122. This may confirm removal of the spot from the available parking spots for the parking location 124. This message may be sent via unicast.

The server 122 may monitor the transmissions to the towers 120 from the vehicles 102 parked in the campus. For instance, this may include monitoring of the quantity of vehicle 102 TCUs 110 that are parked or otherwise located in communication with each respective tower 120. This data may be compared to an expected maximum number of vehicles 102. By doing so, the server 122 may make decisions based on the quantity of vehicles 102 located in the parking location 124 served by the towers 120. In general, as point-to-multipoint broadcasts such as eMBMS allocate dedicated RF resources for broadcast use, it may be cost-effective and efficient to use for some quantities of vehicles 102, but not for all quantities of vehicles 102.

If the quantity of parked vehicles 102 exceeds a threshold (for example, 70%), the server 122 may determine that network traffic is low enough that point-to-multipoint broadcasting is no longer more desirable to use for parking lot availability data 126 transmissions to vehicles 102. If the quantity of actively transmitting vehicles increases; however, then the server 122 may determine that network traffic is high enough that point-to-multipoint broadcasting is preferred. For vehicles 102 attempting to park while point-to-multipoint service is stopped, the vehicle 102 may instead use the TCU 110 to retrieve parking lot availability via unicast, not broadcast.

The threshold between these two modes may depend on real-time multicast subscribers, independent of parking availability. For example, the parking location 124 may be empty, but, without many users looking for a spot, unicast may be more efficient use of bandwidth. Such a threshold could be, for example, ten or fewer unicast requests per minute to remain on unicast, and a switch to broadcast if the count of requests exceeds the threshold.

In an more specific example, the server 122 may perform a point-to-multipoint retransmit every T seconds (e.g., T=10 seconds), with the assumption of the message size for unicast and multicast being the same. Let on average, during a timeframe T at a given time, there be N unicast requests (for parking availability message) serviced by a local tower 120. (e.g., N=5 users during an average period of T=10 seconds).

A ratio of available bandwidth unicast vs P2M may be therefore be determined. For instance, with 40 MHz of cellular spectrum and 5 MHz of point-to-multipoint spectrum available, a ratio R may be computed as R=8/1 (as one example, other allocations and ratios are possible). This may further scale with cost differences of each type of bandwidth. In an example, switching between modes may be performed as follows based on the quantity of N unicast requests per timeframe T, as shown in equation (1)

If N>R during time T, use P2M;

If N<=R during time T, use Unicast    (1)

Alternate and/or additional factors may be used in performance of the switching between modes. In an example, the switching may be based on time period of the day, for example, morning, lunch, and/or evening rush hour may default to P2M, while other times may default to unicast. It should also be noted that hysteresis may be optionally performed on the transition between modes, to avoid issues with constant switching back and forth between modes, which may itself incur switching overhead in terms of tower 120 and/or vehicle 102 processing and reconnection.

Figure 3:
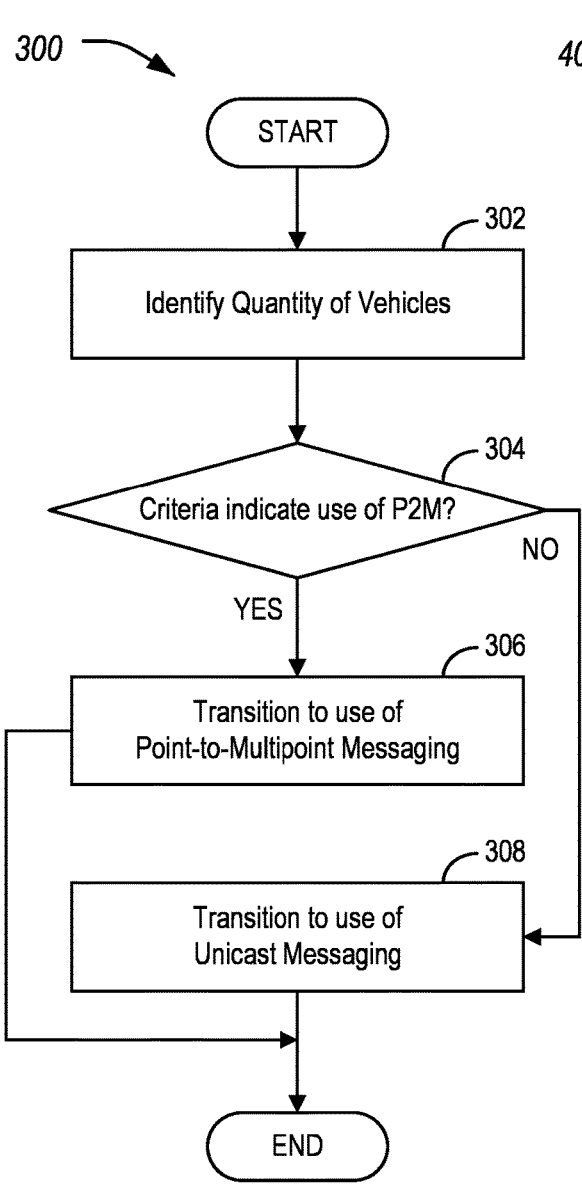
FIG. 3 illustrates an example process for the selective use of multipoint broadcast technology and unicast messaging for providing parking availability data.

FIG. 3 illustrates an example process 300 for selective use of point-to-multipoint messaging and unicast messaging for providing parking availability data 126. In an example, the process 300 may be performed by the server 122 in communication with one or more cell towers 120.

At operation 302, the server 122 identifies a quantity of vehicles 102. In an example, the server 122 may receive information from the one or more cell towers 120 indicative of the quantity of TCUs 110 that are wirelessly parked or otherwise connected to the one or more cell towers 120. In another example, the server 122 may maintain information indicative of the number of requests from unique vehicles 102 that are received to the server 122 from the one or more cell towers 120 within a time period T.

At operation 304, the server 122 determines whether criteria indicate the use of P2M or unicast. In an example, the server 122 may utilize the criteria discussed above with respect to equation (1). Alternate and/or additional factors may be used, also as discussed above. Moreover, in some examples historical criteria may also be used as a factor, as discussed below with respect to the process 500.

At operation 306, the server 122 transitions to use of P2M messaging for broadcasting parking availability data 126 indicative of available spots in the parking location 124. By using P2M communications, many vehicles 102 are able receive the latest parking availability data 126 at the same time. This advantageously reduces network resource utilization, lowering usage costs.

While in unicast, each vehicle 102 may retrieve the parking lot availability information at a different time. Thus, it may occur that a vehicle 102 locks a spot while other vehicles 102 may not receive the updated parking availability data 126 and may also attempt to lock the same spot. Accordingly, use of P2M communications may avoid incidence of double-lock situations for the same spot. Moreover, if the server 122 performs the spot assignment, the chance of a double-lock situation is further reduced. In addition, P2M may allow for the update of the parking availability data 126 to all vehicles 102 at the same time, while in unicast some vehicles 102 may show different parking availability data 126 depending on how recently the update was made.

At operation 308, the server 122 transitions to use of unicast messaging for broadcasting parking availability data 126 indicative of available spots in the parking location 124. After operations 306 or 308, the process 300 ends. It should be noted, however, that the process 300 may run continuously, based on a monitoring of the one or more cell towers 120 by the server 122.

Figure 4:
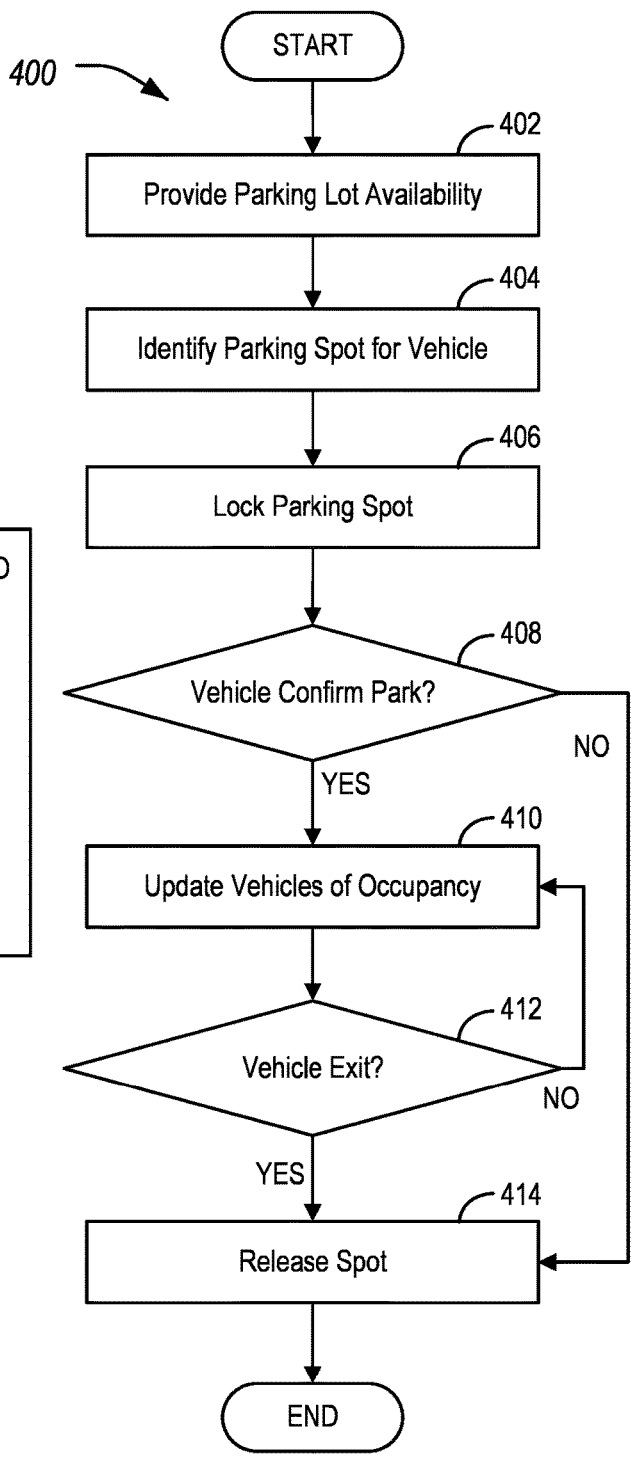
FIG. 4 illustrates an example process for the use of the parking availability data for parking spot acquisition.

FIG. 4 illustrates an example process 400 for the use of the parking availability data 126 for parking spot acquisition. In an example, the process 400 may also be performed by the server 122 in communication with one or more cell towers 120.

At operation 402, the server 122 provides the parking availability data 126 to a vehicle 102. In an example, the parking availability data 126 provide in operation 402 and in the other operations of the process 400 may be provided either via P2M or via unicast, chosen as discussed in detail with respect to the process 300.

At operation 404, the server 122 identifies a parking spot for the vehicle 102. In one example, the server 122 may receive a message from the vehicle 102 identifying the parking spot. In another example, the server 122 may receive an indication from the vehicle 102 for the server 122 to automatically assign a spot, in which case the server 122 may perform the assignment automatically based on predefined settings.

At operation 406, the server 122 locks the parking spot. In an example, the server 122 updates the parking availability data 126 to indicate that the identified parking spot is locked and should not be used. Further requests to use the parking spot from other vehicles 102 may accordingly be denied.

At operation 408, the server 122 confirms whether the vehicle 102 has parked. This can be done, in an example, by the TCU 110 of the vehicle 102 automatically via unicast when the vehicle 102 arrives at the spot and changes the transmission to park. In an example, the server 122 may receive a message from the vehicle 102 indicating that the vehicle 102 has successfully parked in the parking spot. In response, the server 122 may update the parking availability data 126 to indicate that the spot is occupied, and not merely locked. This information may be provided to the vehicles 102 in the parking availability data 126 at operation 410.

At operation 412, the server 122 determines whether the vehicle 102 has left the parking spot. In an example, the server 122 may receive a message from the vehicle 102 indicating that the vehicle 102 has departed instead of parked. If so, the parking availability data 126 may be updated to release the lock. The updated parking availability data 126 may accordingly be provided by the server 122 at operation 414.

If, at operation 408, the server 122 does not receive confirmation of the park, the lock may timeout and the parking availability data 126 may be updated to release the lock. The updated parking availability data 126 may accordingly be provided by the server 122 at operation 414. After operation 414, the process 400 ends. It should be noted, however, that the process 400 may run concurrently for multiple vehicles 102.

Variations on the discussed approaches may be utilized. For instance, the disclosed approaches may apply to an urban area as opposed to a campus or individual parking location 124. In such an example, the server 122 may cover multiple disparate parking locations 124 (such as paid parking structures/areas). Each of the parking locations 124 may be associated with a parking price. The price may, in some examples, also be dynamic based on the factors such as time of day, lot occupancy level (empty, full) to allow a customer to choose accordingly and a lot to lower the price when too few spots are occupied and raise the price when the lot is mostly full.

In another example variation, as noted above the network coverage may exceed a campus. In such a case, the multicast messages may include a geo-fence of the campus so that a vehicle 102 outside of the geo-fence area may be able to ignore the parking availability data 126 message.

In yet another example variation, responsive to the vehicle 102 entering the parking multicast area, the vehicle HMI 106 may display a message indicating that parking information is available. The user may select this message and the HMI 106 may bring up the parking spot information. Otherwise, the user may ignore the message if parking is not required.

In yet another variations, while in many examples the parked indications and/or the exit indications may not count as one of the quantity of unicast requests, in some alternate examples those indications may also count with respect to the quantity of unicast requests.

Moreover, as the system 100 goes through the multipoint to unicast switching over time (e.g., a few weeks or a month), the system 100 may capture data with respect to which modes are used at which times. Using this information, the system 100 may learns to default to a particular mode, i.e., either multipoint or unicast for a certain period of the day and day of week etc. Using that information, the system 100 may change modes, as discussed above, based on the number of vehicles 102 requesting service. This additional aspect may make the system 100 change modes fewer times, while preserving its dynamic nature.

Figure 5:
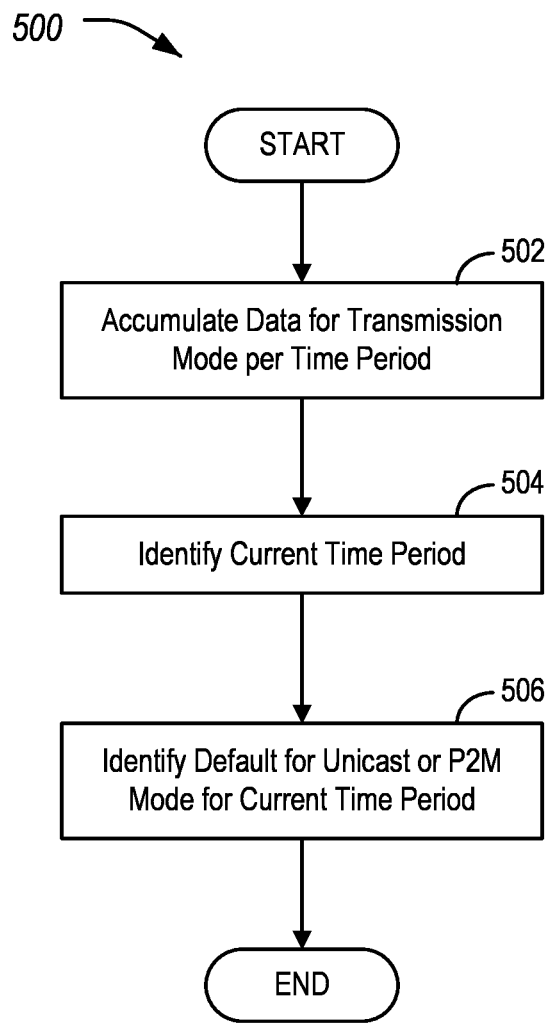
FIG. 5 illustrates an example process for the learning default broadcast technologies per time period.

FIG. 5 illustrates an example process 500 for the learning of default broadcast technologies per time period. In an example, the process 500 may also be performed by the server 122 in communication with one or more cell towers 120.

At operation 502, the server 122 accumulates data with respect to transmission mode per time period. In an example, the server 122 may maintain historical information with respect to whether the P2M or unicast is being used. This historical information may be maintained by time period (e.g., by hour, by ten-minute block, etc.) and by day of week. For instance, for each time period, the server 122 may determine whether the system 100 is more likely to be using P2M or unicast.

At operation 504, the server 122 identifies the current time period. For instance, the server 122 may utilize clock functionality to determine the current time period and day of week. This current time may be determined as one of the time periods for which historical information is maintained at operation 502.

At operation 506, the server 122 identifies a default for unicast of P2M mode of operation based on the current time and the accumulated data. This default may accordingly be used as an aspect of the determination of which mode to choose, e.g., as a factor as discussed above with respect to operation 304 of the process 300.

Computing devices described herein, such as the controllers 104, TCU 110, and parking server 122, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for selective use of point-to-multipoint messaging and unicast messaging for parking spot acquisition comprising:
   one or more cellular towers configured to provide wireless services to a parking location over the point-to-multipoint messaging and the unicast messaging; and
   a server, in communication with the one or more cellular towers, programmed to:
      perform a point-to-multipoint retransmit of parking availability data with a predefined update period,
      receive, via the one or more cellular towers, a quantity of unicast requests for parking availability,
      if the quantity of unicast requests received within the predefined update period exceeds a ratio of point-to-multipoint bandwidth to unicast messaging bandwidth, transition to use of the point-to-multipoint messaging to send the parking availability data via the one or more cellular towers, and
      if the quantity of unicast requests received within the predefined update period does not exceed the ratio of point-to-multipoint bandwidth to unicast messaging bandwidth, transition to use of the unicast messaging to send the parking availability data via the one or more cellular towers.

2. The system of claim 1, wherein the point-to-multipoint messaging is Evolved Multimedia Broadcast Multicast Services (eMBMS).

3. The system of claim 1, wherein the server is further programmed to:
   identify a parking spot for a vehicle; and
   lock the parking spot for use by the vehicle.

4. The system of claim 3, wherein the server is further programmed to:
   receive an indication of the parking spot to lock from the vehicle as one of the quantity of unicast requests, selected from a display of available parking spots provided in a human machine interface (HMI) of the vehicle based on the parking availability data; and
   identify the parking spot for the vehicle as identified in the indication.

5. The system of claim 3, wherein the server is further programmed to identify the parking spot for the vehicle according to personalized parking lot preferences for the vehicle.

6. The system of claim 3, wherein the server is further programmed to receive a parked indication that the vehicle confirms a parked state in the parking spot.

7. The system of claim 3, wherein the server is further programmed to receive an exit indication that the vehicle confirms exiting the parking spot.

8. The system of claim 1, wherein the server is further programmed to:
   accumulate data with respect to use of unicast messaging or point-to-multipoint messaging per each of a plurality of time periods of day and week, to determine a default messaging protocol of either unicast messaging or point-to-multipoint messaging per the plurality of time periods;
   identify a current time period; and
   initially utilize the default messaging protocol for the current time period to reduce occurrence of transitions based on the quantity of unicast requests.

9. A method for selective use of point-to-multipoint messaging and unicast messaging for parking spot acquisition comprising:
   performing a point-to-multipoint retransmit of parking availability data with a predefined update period;
   receiving, via one or more cellular towers, a quantity of unicast requests for parking availability;
   if the quantity of unicast requests received within the predefined update period exceeds a ratio of point-to-multipoint bandwidth to unicast messaging bandwidth of the one or more cellular towers, transitioning to use of the point-to-multipoint messaging for sending the parking availability data via the one or more cellular towers; and
   otherwise, transitioning to use of the unicast messaging for sending the parking availability data via the one or more cellular towers.

10. The method of claim 9, wherein the point-to-multipoint messaging is Evolved Multimedia Broadcast Multicast Services (eMBMS).

11. The method of claim 9, further comprising:
    identifying a parking spot for a vehicle; and
    locking the parking spot for use by the vehicle.

12. The method of claim 11, further comprising:
    receiving an indication of the parking spot to lock from the vehicle as one of the quantity of unicast requests, selected from a display of available parking spots provided in a human machine interface (HMI) of the vehicle based on the parking availability data; and
    identifying the parking spot for the vehicle as identified in the indication.

13. The method of claim 11, further comprising identifying the parking spot for the vehicle according to personalized parking lot preferences for the vehicle.

14. The method of claim 11, further comprising receiving a parked indication that the vehicle confirms a parked state in the parking spot, the parked indication being received via unicast.

15. The method of claim 11, further comprising receiving an exit indication that the vehicle confirms exiting the parking spot.

16. The method of claim 11, further comprising:
    accumulating data with respect to use of unicast messaging or point-to-multipoint messaging per each of a plurality of time periods of day and week, to determine a default messaging protocol of either unicast messaging or point-to-multipoint messaging per the plurality of time periods;
    identifying a current time period; and
    initially utilizing the default messaging protocol for the current time period to reduce occurrence of transitions based on the quantity of unicast requests.

17. A non-transitory computer-readable medium comprising instructions for selective use of point-to-multipoint messaging and unicast messaging for parking spot acquisition that, when executed by a processor of a server in communication with one or more cellular towers, cause the server to:

perform a point-to-multipoint retransmit of parking availability data with a predefined update period;

receive, via the one or more cellular towers, a quantity of unicast requests for parking availability;

if the quantity of unicast requests received within the predefined update period exceeds a ratio of point-to-multipoint bandwidth to unicast messaging bandwidth of the one or more cellular towers, transition to use of the point-to-multipoint messaging to send the parking availability data via the one or more cellular towers; and otherwise, transition to use of the unicast messaging to send the parking availability data via the one or more cellular towers.

18. The medium of claim 17, further comprising instructions that when executed by the processor of the server, cause the server to:

identifying a parking spot for a vehicle; and locking the parking spot for use by the vehicle.

19. The medium of claim 18, further comprising instructions that when executed by the processor of the server, cause the server to:

receive an indication of the parking spot to lock from the vehicle as one of the quantity of unicast requests, selected from a display of available parking spots provided in a human machine interface (HMI) of the vehicle based on the parking availability data; and identify the parking spot for the vehicle as identified in the indication.

20. The medium of claim 18, further comprising instructions that when executed by the processor of the server, cause the server to identify the parking spot for the vehicle according to personalized parking lot preferences for the vehicle.

21. The medium of claim 18, further comprising instructions that when executed by the processor of the server, cause the server to receive a parked indication that the vehicle confirms a parked state in the parking spot.

22. The medium of claim 18, further comprising instructions that when executed by the processor of the server, cause the server to receive an exit indication that the vehicle confirms exiting the parking spot.

23. The medium of claim 17, further comprising instructions that when executed by the processor of the server, cause the server to:

accumulate data with respect to use of unicast messaging or point-to-multipoint messaging per each of a plurality of time periods of day and week, to determine a default messaging protocol of either unicast messaging or point-to-multipoint messaging per the plurality of time periods;

identify a current time period; and initially utilize the default messaging protocol for the current time period to reduce occurrence of transitions based on the quantity of unicast requests.

\* \* \* \* \*